(No Model.)
R. GATENBY, Sr.
SEED DRILL.
No. 417,555.        Patented Dec. 17, 1889.
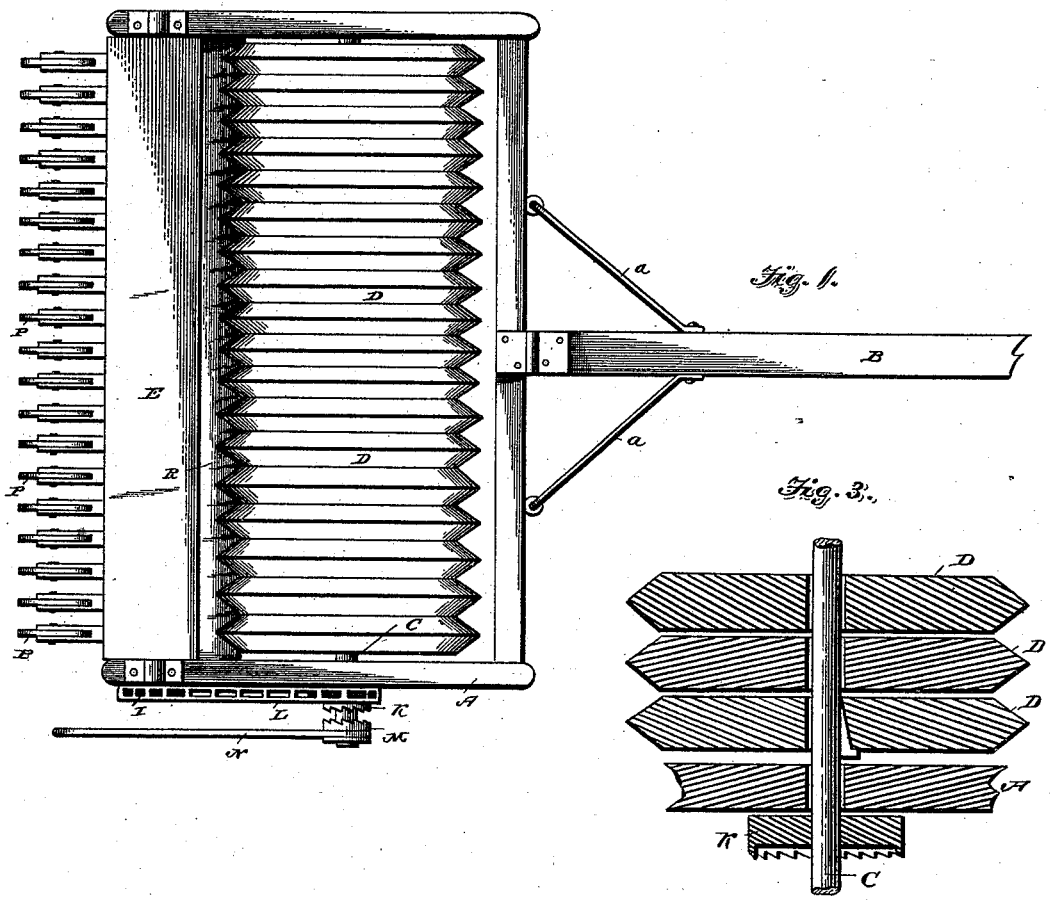
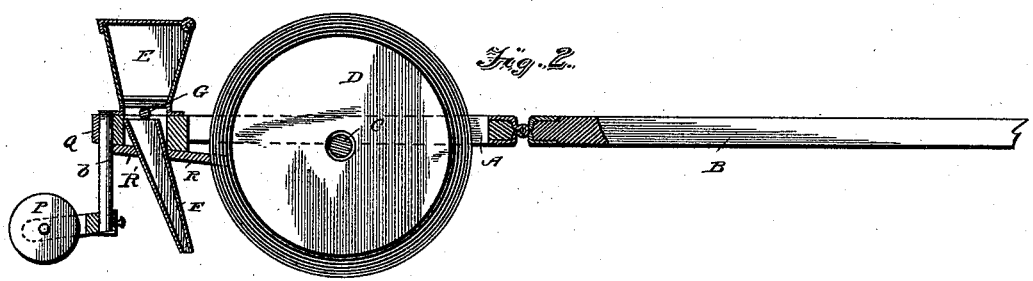
Witnesses:
Robt. Gatenby, Sr.
Inventor:
By James J. Sheehy
Attorney.

UNITED STATES PATENT OFFICE.

ROBERT GATENBY, SR., OF CRYSTAL, (DAKOTA TERRITORY,) NORTH DAKOTA.

SEED-DRILL.

SPECIFICATION forming part of Letters Patent No. 417,555, dated December 17, 1889.

Application filed October 6, 1888. Renewed November 4, 1889. Serial No. 329,111. (No model.)

*To all whom it may concern:*

Be it known that I, ROBERT GATENBY, Sr., a citizen of the United States, residing at Crystal, in the county of Pembina and Territory of Dakota, have invented certain new and useful Improvements in Seed-Drills; and I do declare the following to be a full, clear, and exact description of the invention, such as will enable others skilled in the art to which it appertains to make and use the same.

This invention has relation to seed-drills; and the novelty will be fully understood from the following description, when taken in connection with the accompanying drawings, in which—

Figure 1 is a plan view of a machine constructed according to my invention, showing the draft-beam partly broken away; and Fig. 2 is a vertical sectional view of the same. Fig. 3 is a sectional detail showing fast and loose rollers or drill-formers.

Referring by letter to the said drawings, A indicates the main frame, which is preferably of a rectangular form and provided with a suitable draft beam or tongue B, which is hinged to the forward portion of the main frame and staid in proper position by means of brace-arms *a*.

C indicates a horizontal shaft, which is suitably journaled in the lateral beams of the main frame A, and on this shaft is arranged a suitable number of pressure-rollers D. These rollers D are of a peculiar construction, having their peripheries tapered or beveled to opposite sides from a central point, so as to present a periphery of approximately V shape in cross-section. In practice the greater number of these rollers are arranged loosely upon the shaft C, so that they may turn freely thereon, while one or more of them should be fixed to the said shaft, so as to rotate the same, for a purpose which will be presently explained.

Fixed to the rear of the main frame is a suitable hopper E, and leading from this hopper at a point directly in rear of each roller is a drill-tube F, which may be of any suitable form, the hopper being also constructed according to the dictation or fancy of the mechanic.

G indicates a grain-shaft, which is arranged at the base of a hopper, and is provided at its outer end with a fixed sprocket-wheel I, a similar wheel, carrying one-half of a clutch K, being arranged on the adjacent end of the shaft C, and these two sprocket-wheels are connected by means of a belt or chain L, so that when motion has been imparted to the main rotative shaft C by the rollers coming in contact with the earth it may be imparted by means of the endless chain, so as to operate the seed-shaft.

M indicates the opposite half of the clutch, the same being of the ordinary construction usually employed for such purposes, and is provided with a hand-lever N, so that when it is desirable to throw the machine out of operation during transportation the operator may do so by the manipulation of this lever. It should be here remarked that I employ a seed-tube, which may be of any suitable form, directly in rear of each roller and at a point about the middle or in line with the taper thereon, so that as the machine advances, forming grooves in the compressed earth, the tubes may drop their seed in the grooves thus formed.

P indicates rollers for covering the grain as it has been deposited. These rollers are arranged one in rear of each seed-tube. In practice these covering-rollers are about one inch in width and are made adjustable, being arranged upon the lower end of a vertical stem or shaft *b*, which I secure to a frame Q at the rear of the main frame.

R indicates a clearing-plate for the rollers, which has its engaging edge notched to conform to the combined surface of the rollers, fitting snugly against the peripheries and into the beveled sides thereof at the rear of the machine. It will be observed that this plate R is integral with the floor R', which latter is perforated at proper intervals for receiving and holding the drill-tubes F. This feature of my invention I consider very important, as it not only greatly simplifies the device, but a very firm rigid support is afforded the front serrated extension or clearer R. This clearing-plate is particularly desirable when the earth is of such a sticky consistency as to adhere to the rollers.

I have found by experience that a machine of this construction may be employed to an advantage when there is straw or rubbish in the field without the necessity of employing means to remove it, as it will bury the same into the earth to decay, without any obstruction whatever to the free travel and working of all of the parts.

Another essential feature of my invention is the employment between the end drill-rollers, which are fast on the shaft C, of drill-rollers which are free to turn on this shaft, as above described. By using the loose rollers I find that there is less drag on the team, especially with heavy land, as the loose rollers are free to rotate independently of each other, and in turning the machine there will be little or no side draft. Furthermore, by employing loose rollers I am able to readily slip them from their shaft and substitute rollers of different widths, according to the distance apart required of the drills.

Having thus described my invention, what I claim is—

1. The improved grain-drill, herein described, consisting, essentially, of the main frame composed of parallel transverse and lateral beams, the hopper arranged transversely on the rear of said frame, the shaft C, journaled in the lateral beams and having the clutch K M on one end thereof, the rollers D being solid, as distinguishable from hollow rollers, and having V-shaped peripheries, the clearing-plate R, secured beneath the hopper and the entire length thereof and having its forward edge notched, so as to match the combined surface of the rollers, to clean the same, the seed-tubes leading from the base of the hopper through apertures in the clearing-plate, and the covering-rollers arranged one in rear of each seed-tube and in a line with the teeth of the clearing-plate and notches of the rollers, substantially as specified.

2. The combination, in a grain-drill, of a main frame A, a shaft journaled therein and having both fast and loose drill-rollers on it, a hopper mounted upon transverse bars of the main frame, the perforated floor R', secured to said bars and receiving the drill-tubes, and the serrated clearing front extension R of said floor, formed integral with it, as specified.

In testimony whereof I affix my signature in presence of two witnesses.

ROBERT GATENBY, Sr.

Witnesses:
THOS. J. CUNNINGHAM,
SANFORD CARFIELD.